(12) United States Patent
Knodel (10) Patent No.: US 8,678,030 B2
(45) Date of Patent: Mar. 25, 2014

(54) FLOW DIVIDER

(75) Inventor: Peter Knodel, Oyten (DE)

(73) Assignee: VEMAG Maschinenbau GmbH, Verden/Aller (DE)

( * ) Notice: Subject to any disclaimer, the term of this patent is extended or adjusted under 35 U.S.C. 154(b) by 538 days.

(21) Appl. No.: 12/897,103

(22) Filed: Oct. 4, 2010

(65) Prior Publication Data

US 2011/0079304 A1    Apr. 7, 2011

(30) Foreign Application Priority Data

Oct. 6, 2009    (DE) .................... 20 2009 013 467 U (51) Int. Cl.
*F16L 41/00*    (2006.01)
*G01F 11/00*    (2006.01)

(52) U.S. Cl.
USPC .................. 137/561 A; 222/330; 418/253

(58) Field of Classification Search
USPC ................ 137/561 A, 565.33; 222/330, 333; 418/253–255; 426/105, 646
See application file for complete search history.

(56) References Cited

U.S. PATENT DOCUMENTS

| | | | | |
|---|---|---|---|---|
| 3,874,643 A | * | 4/1975 | Lorenian et al. | 366/76.92 |
| 4,619,594 A | * | 10/1986 | Moir | 418/5 |
| 5,037,283 A | * | 8/1991 | Kapur et al. | 418/133 |
| 5,906,297 A | * | 5/1999 | Cole | 222/134 |
| 6,627,241 B1 | * | 9/2003 | DeMars et al. | 426/512 |
| 7,037,093 B2 | * | 5/2006 | Jong | 418/255 |
| 7,048,525 B2 | * | 5/2006 | Brick et al. | 418/209 |
| 2005/0022870 A1 | | 2/2005 | Brick et al. | |
| 2006/0137536 A1 | * | 6/2006 | De Jong | 99/348 |

FOREIGN PATENT DOCUMENTS

| | | |
|---|---|---|
| DE | 3539426 A1 | 5/1987 |
| DE | 102004020410 A1 | 12/2005 |
| DE | 202008004552 U1 | 7/2008 |
| EP | 0828437 B1 | 12/2000 |
| FR | 2353729 A1 | 12/1977 |
| NL | 1022813 C1 | 4/2003 |
| WO | 2009/071318 A2 | 6/2009 |

OTHER PUBLICATIONS

European Patent Office, European Search Report in EP Application No. 10186480, Sep. 27, 2013.

* cited by examiner

*Primary Examiner* — John Rivell
*Assistant Examiner* — David Colon Morales
(74) *Attorney, Agent, or Firm* — Wood, Herron & Evans, L.L.P.

(57) ABSTRACT

A filling flow divider for portioning a filling substance includes at least two divider elements operatively connected together, each including a stator having a main chamber, a rotor in the main chamber and rotatable about an axis of rotation, and at least two blade elements fitted into the rotor. The blade elements are independently displaceable relative to the rotor in the radial direction as the rotor rotates in the main chamber. The filling flow divider includes at least two connecting devices coupling the rotors of the at least two divider elements such that the rotor and blade elements of one divider element are disposed at a different rotary angle position as the rotor and blade elements of an adjacent divider element.

14 Claims, 6 Drawing Sheets

FLOW DIVIDER

TECHNICAL FIELD

The present invention is directed to a filling flow divider and in particular to a filling flow divider for portioning filling substances for a plurality of filling regions.

BACKGROUND

Filling substances such as sausage material, creams, or pastes are generally distributed to various filling regions or filling passages by a filling flow divider and are fed with a volume flow to the individual packagings or packs. This process involves distributing the filling substances to the individual filling regions and, at the same time, portioning the filling substances.

A known filling flow divider for portioning filling substances is disclosed in EP 0 828 437 B1. In that case, a filling substance is introduced into the filling flow divider and distributed by rotating devices to the individual filling regions, with a portioning effect being produced. The filling flow divider includes a rotor which is arranged in a cavity in a housing and which is rotatable about an axis. The filling flow divider includes blade elements which are slidingly movable in openings in the rotor and which are urged outwardly in a radial direction away from the axis of the rotor of a spring so that the blade elements bear slidingly against the inside wall of the cavity. Defined between the rotor, at least two adjacent blade elements, and the inside wall of the cavity are chambers which increase and decrease in size dynamically based on the rotation of the rotor about its fixed axis and the movement of the blade elements. In accordance with the mechanical configuration of the rotor, the position of the axis of the rotor in the cavity, and the shape of the cavity, a preferred rotary and filling substance flow direction is achieved.

The filling substances to be portioned and distributed by the filling flow divider can be composed of various constituents, that do not dissolve in each other or form with each other a homogeneous solution in the sense of an emulsion because of differing viscosity, nature, or size of the constituents. Certain filling substances are therefore only mixed with one another. It is also necessary for the portioning operation to be effected with a certain level of accuracy.

Figure 5:
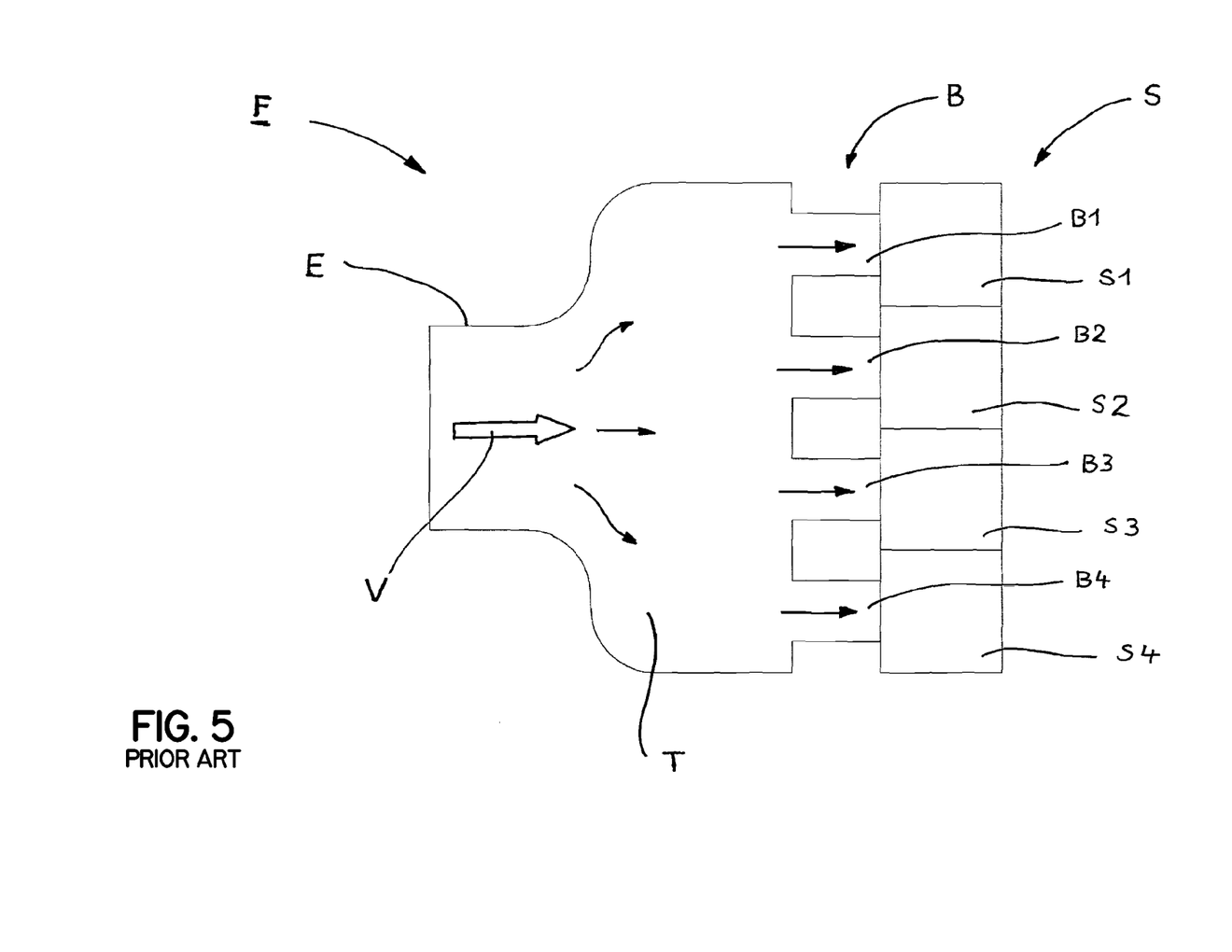
FIG. 5 shows a side view of a known filling flow divider and its components.
Figure 6:
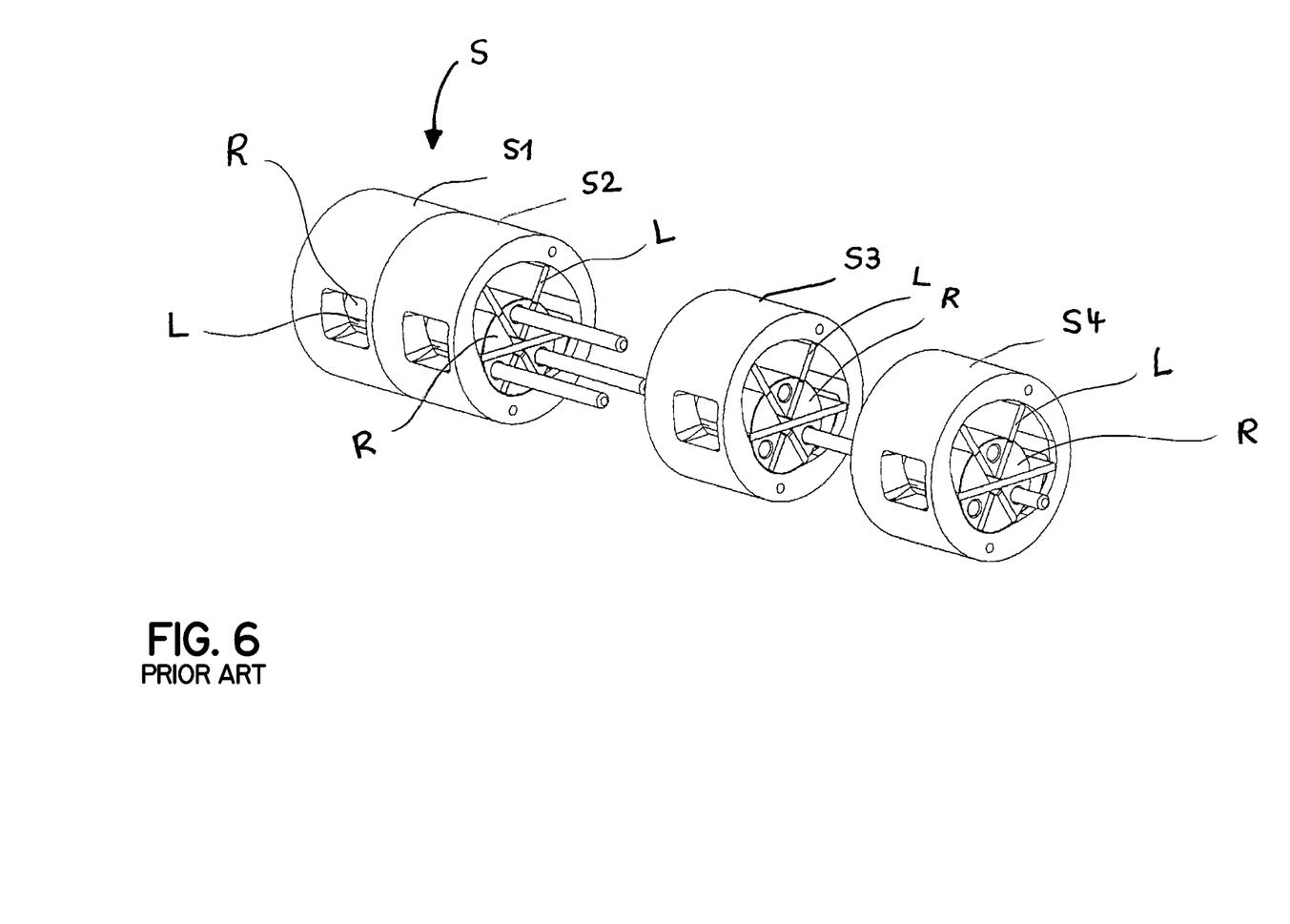
FIG. 6 shows a perspective view of divider elements of the known filling flow divider of FIG. 5.

Another known apparatus is also shown in FIGS. 5 and 6.

Referring to FIG. 5, a filling flow divider F is arranged in such a way that a volume flow V of the filling substance is supplied in an inlet region E of the filling flow divider F and distributed within the filling flow divider F to various filling regions B (for example four filling regions B1, B2, B3 and B4). Individual segments S, for example the segments S1, S2, S3 and S4, are arranged at the filling regions B.

The volume flow V is fed to the filling flow divider F and distributed in the distributor region T in the interior of the filling flow divider F to the individual filling regions B. The filling substance (volume flow V) is fed by way of each filling region B to the corresponding segment S and in the respective segment moves a rotor R with blade elements L. The rotors R are rotated in conjunction with the blade elements L, and portioned discharge of the filling substance occurs in a corresponding outlet region of the respective segments S of the filling flow divider F.

In the above-described filling flow divider F, however, there is the danger that changes in the filling substance can occur as a consequence of inevitable pressure fluctuations and pressure peaks in the flow of the filling substance through the filling flow divider F and a concomitant non-linear configuration in filling and emptying the filling flow divider. Moreover, inaccuracies in portioning can also occur.

SUMMARY OF THE INVENTION

The object of the present invention is to provide a filling flow divider that ensures uniform filling of the pack to be filled and substantially avoids an unwanted change in the filling substance flowing through the filling flow divider.

In accordance with the present invention, the filling flow divider for portioning filling substances includes at least two divider elements which are operatively connected together. Each divider element includes a stator having a main chamber, a rotor arranged in the main chamber and rotatable relative to the stator about an axis of rotation, and at least two blade elements which are fitted into the rotor. The blade elements are independently displaceable in the radial direction relative to the axis of rotation of the rotor and move with the rotation of the rotor in the main chamber of the stator. The filling flow divider also includes at least two connecting devices configured to axially couple the respective rotors of the at least two divider elements. A rotary angle position of the rotor and the associated blade elements of one of the divider elements about the axis of rotation is different in relation to a rotary angle position of the rotor and the associated blade elements of another divider element.

In the filling flow divider, the at least two divider elements are arranged in mutually adjacent relationship and can therefore communicate with each other. In regard to the angular position of the blade elements arranged on each rotor, the rotary position of the blade elements is different for adjacent rotors. To this end, upon the rotary movement of the respective rotor in the divider elements, the corresponding blade elements assume various positions in the stator of the divider element at different times.

Subchambers of the main chamber are formed by the respective blade elements of the rotors. The subchambers are variable dynamically in respect of size and location depending on the rotation of the rotor. The subchambers are capable of taking the filling substance from a feed passage of the filling flow divider at an inlet passage and also discharging the filling substance at an outlet passage at different times. This configuration results in uniform reception and discharge of the filling substance, which is supplied under pressure, by the divider elements of the filling flow divider.

The filling substance is subjected to a considerably lesser loading because the filling substance is more uniformly received within the filling flow divider and also more uniformly discharged to the individual filling regions. The greater degree of uniformity and the avoidance of pressure peaks reduces the risk of altering the filling substance both in its structure and also in relation to the mixture thereof. Therefore, mixture separation of a filling substance having a plurality of components is substantially avoided.

Avoiding pressure peaks and reducing irregularities in the flow of the filling substance through the filling flow divider is thus implemented without further elements such as pressure sensors and regulation of the pressure in the feed and in the discharge passages, using the output signals of the pressure sensors. Thus, improved uniformity in the flow of the filling substance through the filling flow divider and substantially gentle treatment of the filling substance can be achieved. The uniform flow of filling substance through the filling flow divider also leads to more accurate portioning of a volume or the amount of filling substance that is introduced into connected packs.

In the filling flow divider, the rotor can partially fill the main chamber of each divider element and the blade elements can extend in the radial direction relative to the axis of rotation to an inner wall of the main chamber. The blade elements therefore ensure movement and in particular rotation of the rotor in the main chamber of the filling flow divider. The blade elements slide against the inner wall of the main chamber.

The connecting devices of the filling flow divider are located outside the axis of rotation of the rotors. The connecting devices extend through the respective rotors of all divider elements. In this regard, the respective rotors of the divider elements are rigidly connected together and rotate at the same speed of rotation.

In the filling flow divider, the at least two blade elements of the rotor can be arranged at equal angular spacings relative to each other radially with respect to the axis of rotation. The relative position of the blade elements is guided by the sliding movement of the end regions of the blade elements within the main chamber and displaceable mounting of the blade elements in the respective rotor as the rotor rotates. The blade elements can therefore be arranged independently of each other in a radial direction with respect to the axis of rotation in corresponding slot-shaped apertures in the rotor.

To connect the respective rotors of the divider elements of the filling flow divider, each connecting device can include a bar-shaped connecting element which is fitted into corresponding apertures located in the respective rotors and disposed parallel to the axis of rotation. All rotors can be interconnected with the connecting elements.

In one embodiment of the filling flow divider, three blade elements are disposed in the rotor at equal angular spacings relative to each other. Three connecting devices connect the at least two rotors at the apertures in the rotors, which can be arranged at equal angular spacings relative to each other in rotor segments formed between the blade elements. In this way, the rotors can be securely connected together.

The position of the respective apertures of the rotors of the at least two divider elements can be different in the rotor segments formed between the blade elements for each rotor so that the rotors are rigidly connected together with a predetermined angular displacement in their relative angular position (rotational position).

In addition, the respective stators of the at least two divider elements can be connected together so that the main chambers of the divider elements are aligned with each other. Moreover, the subchambers of the respective divider elements can communicate with each other. This configuration of the divider elements ensures that the subchambers which are filled with filling substance can at least partially communicate with each other so as to ensure pressure equalization between the main chambers and in particular between respective subchambers which correspond in angular position.

As described above, the blade elements in conjunction with the rotor in the main chamber of the stator define subchambers which are variable dynamically in size and position with the rotation of the rotor about the axis of rotation. The subchambers of the divider elements are displaced relative to each other by a predetermined rotary angle, but pressure equalization between the subchambers is promoted so that upon conveyance of the filling substance and introduction of the filling substance into the packs to be filled, excessive loading of the filling substance and/or an unwanted change in its properties are avoided.

The stator of the divider element includes an inlet passage and an outlet passage and the filling substance passing from the inlet passage through the main chamber to the outlet passage can actuate rotation of the rotor of the divider element. In this way, the rotation of the rotor of a divider element is adapted for the filling flow and a filling speed of the filling substance. This feature also reduces the risk of a change to the filling substance. Uniform filling is further ensured.

BRIEF DESCRIPTION OF THE DRAWINGS

The present invention is described hereinafter by means of embodiments by way of example with reference to the Figures in which.

DETAILED DESCRIPTION

The filling flow divider according to one embodiment of the present invention is described in detail hereinafter with reference to FIGS. 1 through 3B.

Figure 1:
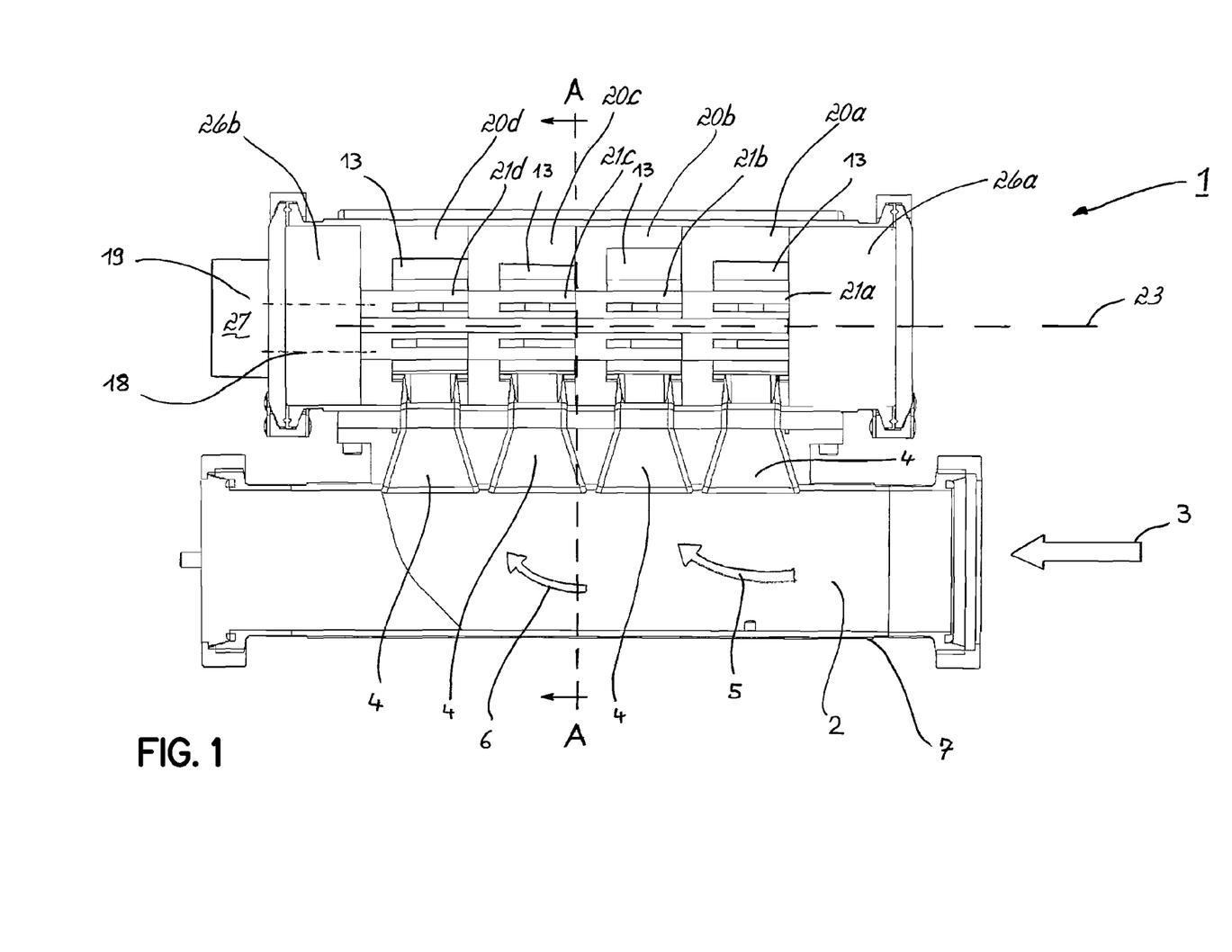
FIG. 1 shows a top cross-sectional view of an overall arrangement of a filling flow divider in accordance with an embodiment of the invention.

As shown in FIG. 1, the filling flow divider 1 includes an inflow passage 2 to which a filling material or a filling substance F is fed in accordance with an identification by an arrow 3. The filling substance F fills the entire space of the inflow passage 2 of the filling flow divider 1 and flows in the direction of a plurality of divider elements 20 such as, for example, a first divider element 20a, a second divider element 20b, a third divider element 20c, and a fourth divider element 20d. Although FIG. 1 shows four divider elements 20a-20d in accordance with this invention there are provided at least two divider elements 20a and 20b.

The filling substance F, which is under a predetermined pressure, is fed to each of the plurality of divider elements 20 by way of a feed passage 4. Preferably a specific feed passage 4 is associated with each divider element 20a-20d. The invention however is not restricted thereto and two adjacent divider elements 20 (for example the divider elements 20a and 20b or the divider elements 20c and 20d) may also have a shared feed passage 4 in other embodiments.

The filling substance F is fed under a predetermined pressure by corresponding pipes connected to the filling flow divider 1 as is indicated by the arrow 3 and flows in conjunction with the predetermined pressure into the inflow passage 2 of the filling flow divider 1 and from there as indicated by arrows 5 and 6 into the respective feed passages 4 of the individual divider elements 20. In that way, a corresponding amount of the filling substance F is fed to each of the divider elements 20.

The filling substance F can be fed with an approximately equal pressure distribution in the form of a cyclic or continuous volume flow of a pasty material.

Figure 2:
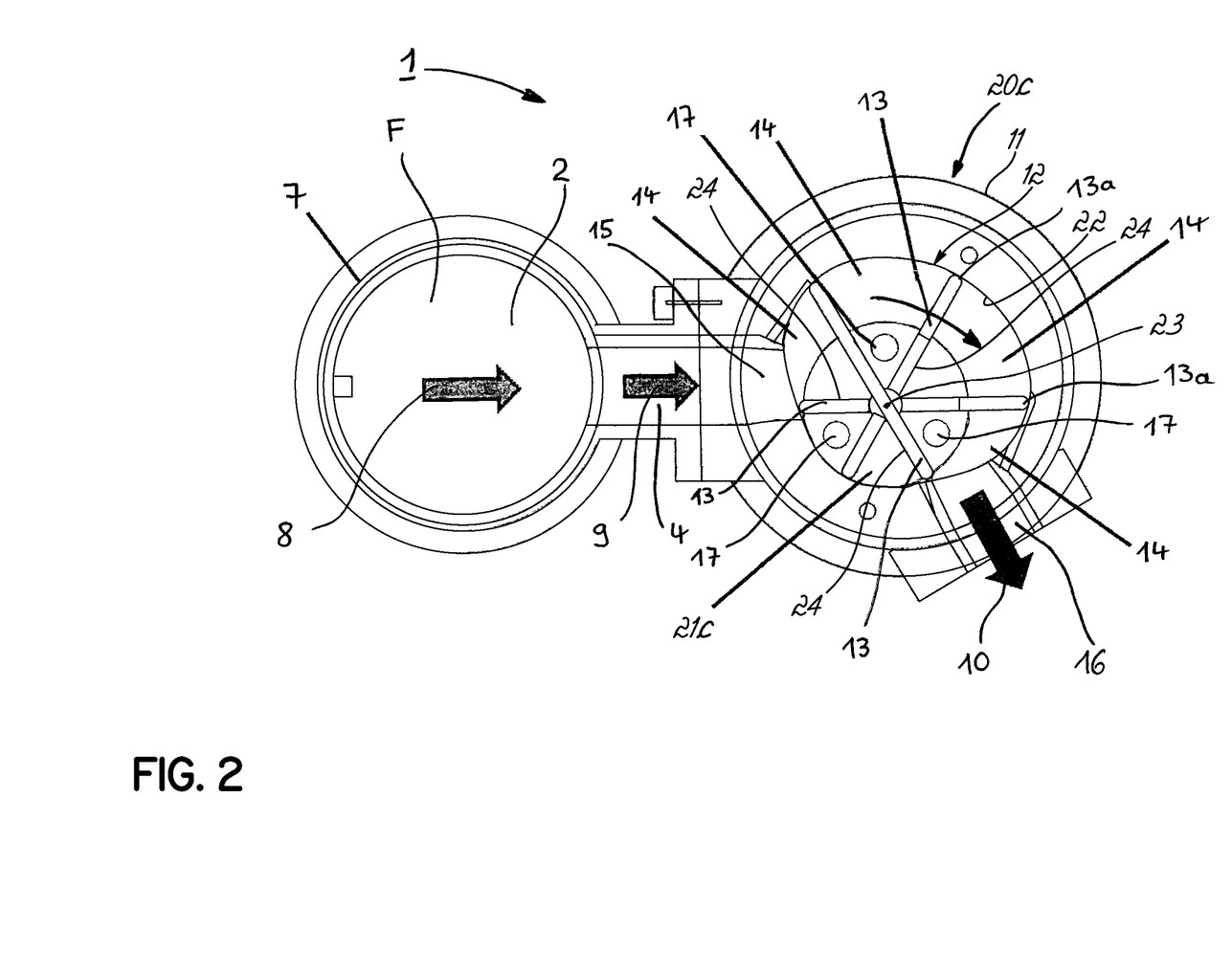
FIG. 2 shows a side cross-sectional view of the filling flow divider of FIG. 1 along the line A-A.

FIG. 2 shows the flow paths of the filling substance F in the filling flow divider 1 from the inflow passage 2 to the feed passage 4. The arrows 8 and 9 in FIG. 2 identify this flow path.

The inflow passage 2 can be a cylindrical or tubular housing 7. One divider element 20 of the at least two divider elements 20a and 20b or the plurality of divider elements 20a-20d is fitted directly to the feed passage 4. While arrows 8 and 9 denote the flow of the filling substance F into the divider element 20, arrow 10 denotes the discharge flow of the filling substance F out of the respective divider element 20 in the direction of a pack to be filled (filling region).

The arrangement of the divider elements 20a-20d is described hereinafter with reference to FIGS. 2, 3A, and 3B.

Figures 3A, 3B:
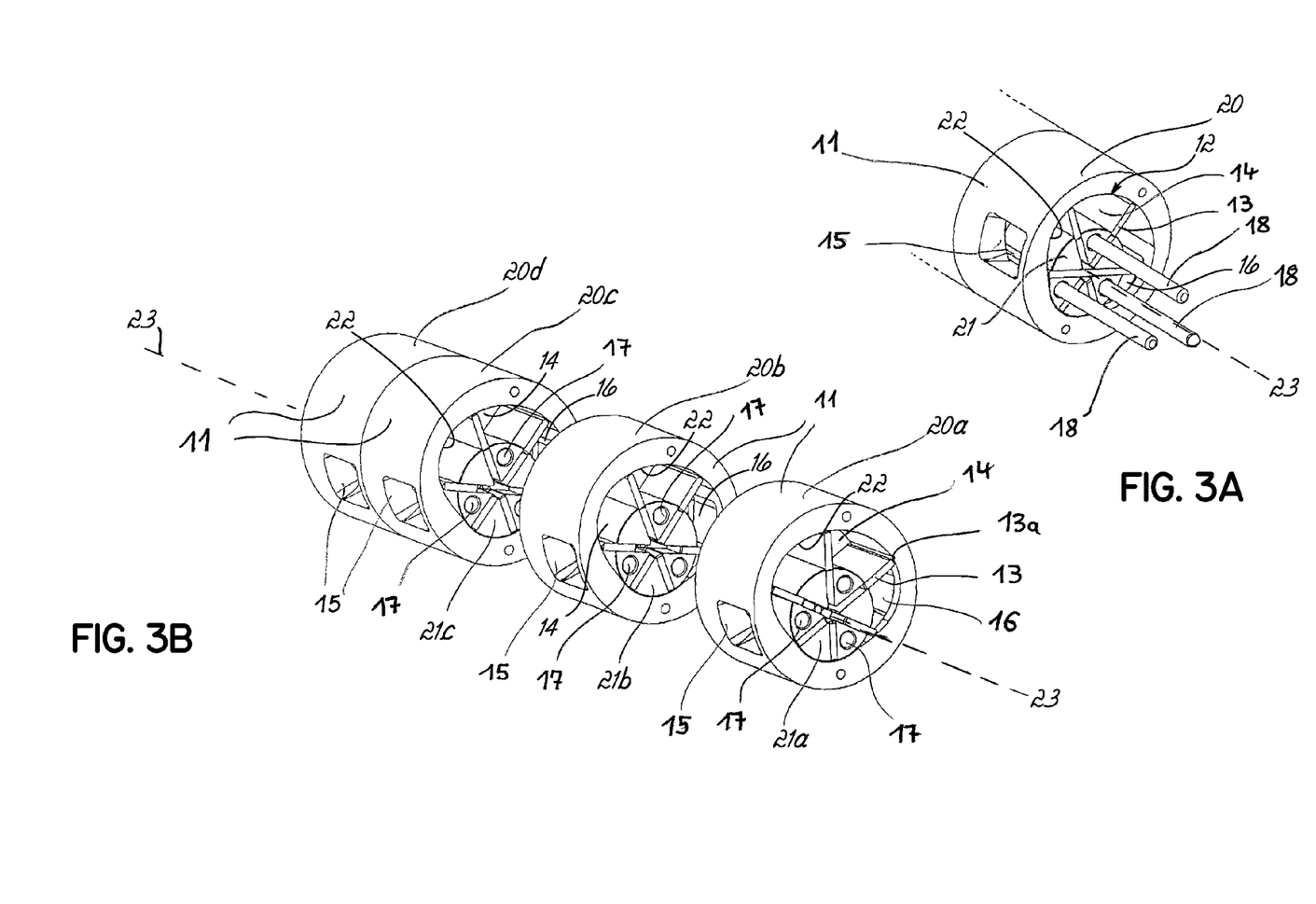
FIGS. 3A and 3B show a perspective view of divider elements of the filling flow divider of FIG. 1.

As shown in FIGS. 2 and 3A, a divider element 20 includes a main housing or a stator 11. Formed in the stator 11 is a main chamber 12 of an irregular cross-section differing from a circular cross-section. Disposed in the main chamber 12 at one side thereof is a rotor 21 which is substantially cylindrical and arranged rotatably in the main chamber 12. Preferably the rotor 21 is disposed at one side of the main chamber 12, wherein the inner wall 22 directly adjacent to the rotor 21 is approximately of a circular cross-section. The diameter of the rotor 21 is less than the overall size of the main chamber 12.

The stator 11 of the divider element 20 is thus of a substantially annular configuration in respect of its outer shape and of a predetermined depth in an axial direction of an axis of rotation 23 of the rotor 21, wherein the rotor 21 is completely enclosed by the stator 11 with a corresponding spacing relative to the inner wall 22 of the main chamber 12.

The rotor 21 includes at least two slot-shaped apertures 24 which extend in the radial direction and into which blade elements 13 are fitted. The blade elements 13 thus extend in the radial direction in the rotor 21 relative to the axis of rotation 23. The blade elements 13 are fitted movably in the rotor 21 and in particular displaceably in the respective slot-shaped apertures 24 in the rotor 21 such that the blade elements 13 bear slidingly with end regions 13a against the inner wall 22 of the main chamber 12 of the stator 11.

When the rotor 21 is rotated about the stationary axis of rotation 23, the end regions 13a of the blade elements 13 then slide against the inner wall 22 of the stator 11 and thus in the boundary region of the main chamber 12 in such a way that the end regions 13a of the blade elements 13 are always guided by the inner wall 22 of the stator 11. That sliding relationship is ensured by the displaceable mounting of the blade elements 13 in the rotor 21.

There are at least two blade elements 13 and preferably three or more blade elements 13 for each rotor 21 of the divider elements 20a-20d, wherein in a corresponding manner there is provided an associated number of slot-shaped apertures 24 in the rotor 21, and all blade elements 13 are fitted in the rotor 21 displaceably in the radial direction relative to the axis of rotation 23. During rotation of the rotor, the blade elements 13 are also displaced in the radial slot-shaped apertures 24 and thus in a radial direction relative to the axis of rotation 23.

With the rotation of the rotor 21 in the clockwise direction, the blade elements 13 also move in the main chamber 12 of the stator 11 in the clockwise direction such that the end regions 13a of the blade elements 13 slide against the inner wall 22 of the stator 11 and thus against the boundary wall of the main chamber 12.

With the rotation of the rotor 21 about the axis of rotation 23, individual subchambers 14 are formed in the remaining space in the main chamber 12 between blade elements 13 which is not occupied by the rotor 21. In dependence on the rotation of the rotor 21, the subchambers 14 change in size and also in angular location with respect to the stator 11. The subchambers 14 are thus variable dynamically in shape and size in connection with the rotary movement and their shape and size is also dynamically variable relative to a rotary angle position of the rotor 21.

FIG. 2 shows that the filling substance F is fed to the main chamber 12 in a flow as indicated by the arrows 8 and 9 by way of the feed passage 4 and an inlet passage 15 arranged in the stator 11 as a continuation of the feed passage 4. The filling substance F which flows at the predetermined pressure is incident on the blade elements 13 fitted into the rotor 21 and thus moves the rotor 21 including the blade elements 13 in a direction of rotation which in FIG. 2 corresponds to the clockwise direction. The filling substance F substantially fills the subchambers 14 whereby a subchamber 14 of variable size and thus variable volume is moved in the clockwise direction with the movement of the rotor 21 and the blade elements 13. The filling substance F that is in a respective subchamber 14 is discharged by an outlet passage 16. The filling substance F which is discharged by way of the outlet passage 16 passes to the pack to be filled (not shown in the Figures), which is arranged at the outlet passage 16, or a further tubular device.

The filling substance F that is discharged at the respective outlet passages 16 of the divider elements 20 and that is fed to the packs to be filled, was distributed and portioned by the inflow passage 2, the feed passages 4, and the main chambers 12 or the plurality of subchambers 14.

In FIG. 1 the filling flow divider 1 includes at least two divider elements 20 and preferably four divider elements 20a-20d. Each of the divider elements 20a-20d is of a structure as described hereinbefore.

FIG. 3B is a perspective view showing the arrangement of a plurality of divider elements 20a-20d, wherein the divider elements 20a-20d are connected together with their respective stators 11 so that the respective main chambers 12 through each stator 11 are arranged in mutually aligned relationship and form an elongate cavity. Each divider element 20a-20d includes the respective inlet passage 15 on one of its sides adjacent the feed passage 4 and the respective outlet passage 16 on the other side, as shown in FIG. 2.

In FIG. 3B, the first and second divider elements 20a and 20b are shown separated from the third and fourth divider elements 20c and 20d, to give an improved perspective view.

The respective rotors 21a-21d are constructed in the same manner and include the plurality of blade elements 13 fitted into slot-shaped radial apertures 24.

In FIG. 3B, the respective rotors 21a-21d have apertures 17 which are provided in each rotor 21 in segments of the rotor 21 located between the blade elements 13. The apertures 17 extend in the axial direction of the rotor 21 parallel to the axis of rotation 23.

Bar-shaped shaft members 18 are inserted into the apertures 17 as shown in FIG. 3A, wherein the shaft members 18 are fitted into the apertures 17 of all rotors 21a 21d so that all rotors 21a 21d are connected together. All rotors 21a-21d therefore rotate synchronously at the same speed about the axis of rotation 23, with no physical shaft being located at the axis of rotation 23.

The apertures 17 in the respective rotors 21a-21d of the divider elements 21a-21d for receiving the shaft members 18 are located in the segments 25 of the rotor 21 between the blade elements 13. The apertures 17 and the shaft members 18 form connecting devices between the plurality of rotors 21a-21d. The connecting devices, the shaft portions 18 of which are not shown in FIG. 3B, thus form a rigid connection between the individual (at least two) rotors 21, and the movement or rotation of all rotors 21 is synchronized. The apertures 17 are disposed in the respective rotors 21 between the blade elements 13 in such a way that, when the shaft members 18 are fitted into the apertures 17 in the respective rotors 21, each of the rotors 21a-21d has a different rotational position relative to another of the rotors 21a-21d.

That means that the rotary angle position of the blade elements 13 of a rotor 21 is different relative to the rotary angle position of comparable or corresponding blade elements 13 of another rotor 21 of the rotors 21a-21d. That arrangement is shown in FIG. 3B insofar as the rotary angle position of the rotor 21a of the first divider element 20a is rotated further in the clockwise direction than the rotary angle position of the rotor 21b of the second divider element 20b. FIG. 1 also shows that the blade elements 13 are in a different position in respect of their rotary angle.

In another embodiment, the respective rotors 21e-21g of the divider elements 20e-21g include respective apertures 17 within a segment 25 located between the blade elements 13 at various locations. To this end, the desired angular displacement is enabled when the shaft members 18 serving as connecting devices are fitted into the respective apertures 17 of adjacent rotors 21e-21g. Such a situation is shown in FIGS. 4A through 4C, this embodiment including an arrangement having a number of three divider elements 20e-20g and thus three rotors 21e-21g.

Figures 4A, 4B:
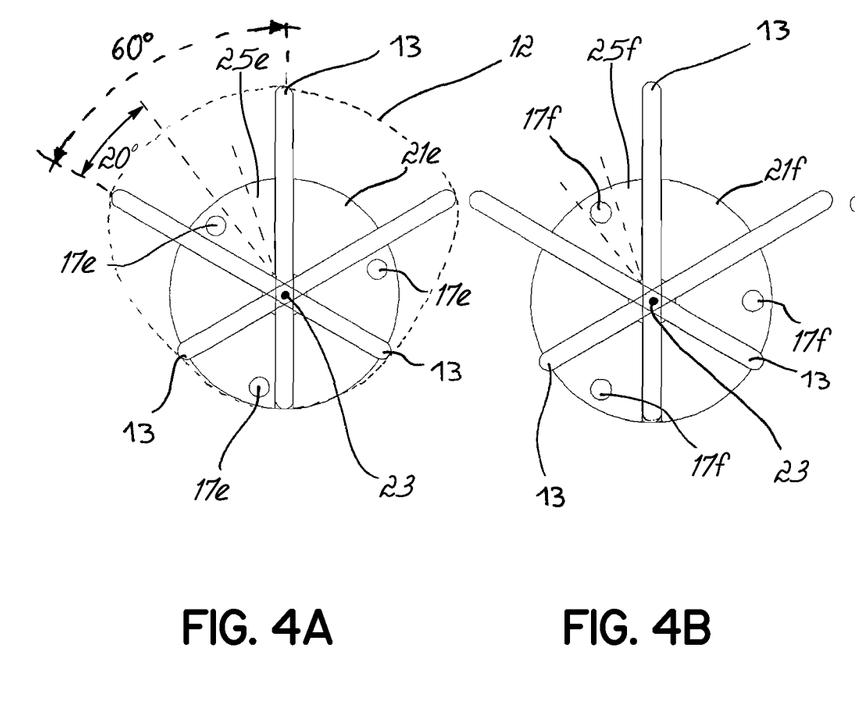
FIGS. 4A, 4B, and 4C show side views of the arrangement of apertures in rotors according to another embodiment of the invention.
Figure 4C:
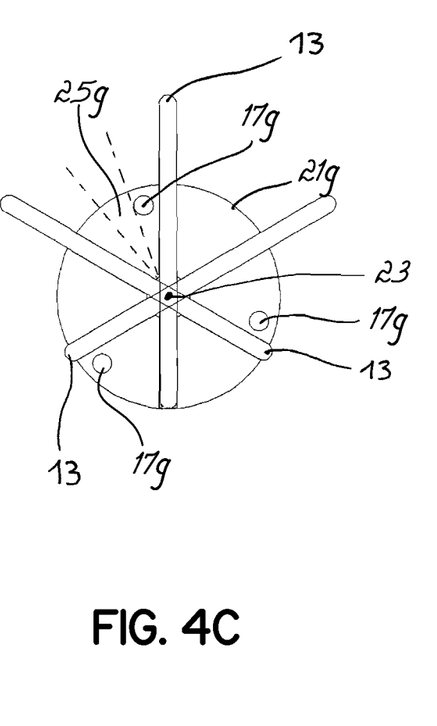

Referring to FIG. 4A the aperture 17e is arranged in a segment 25e located between adjacent blade elements 13 the first rotor 21e. For example the aperture 17e is disposed in the rotor segment 25e in a predetermined first angular subregion of that segment. The total angular region of the segment 25e is 60° in the view in FIG. 4A for example in conjunction with three blade elements 13 fitted into the rotor 21e. The aperture 17e can thus be arranged for example in a first angular subregion of 20° of the segment 25e in question.

The further corresponding apertures 17e in the respective other segments (in the present case with an angular region of 60° of the first rotor 21e are arranged at a corresponding location. Thus, the apertures 17e in the rotor 21e have identical angular spacings, which are 120° in the arrangement shown in FIG. 4A.

In the view in FIG. 4B the corresponding aperture 17f is displaced in the corresponding segment 25f of the second rotor 21f, with respect to the arrangement in FIG. 4A, and the corresponding apertures 17f are disposed in a second angular subregion of about 20° in the respective segment 25f in question of the rotor 21f between the blade elements 13.

In a similar fashion, FIG. 4C shows the third rotor 21g, in which the apertures 17g are arranged within the corresponding segments 25g between the blade elements 13 of the rotor 21g in a third angular subregion of about 20° of that segment 25g and thus substantially adjacent one blade element 13.

As can be seen from FIGS. 4A through 4C, when connecting for example the three rotors 21e-21g, the blade elements 13 of the first rotor 21e are in leading relationship with respect to the angular position of the blade elements 13 of the second rotor 21f and the blade elements 13 of the third rotor 21g are in trailing relationship with the blade elements 13 of the first and second rotors 21e and 21f. In any case, in accordance with the foregoing description, the three rotors 213-21g are fixedly connected together by the preferably bar-shaped shaft portions 18 so that the respective rotors 21e-21g cannot rotate relative to each other.

FIGS. 4A through 4C show an embodiment having three rotors 21e-21g when there are three divider elements 20 in the filling flow divider 1, wherein a uniform angular displacement can be achieved by arranging the apertures 17e, 17f, and 17g respectively in a predetermined but different angular subregion within the rotor segments 25e-25g defined by the blade elements 13 in the rotors 21e-21g.

By comparison, if there are four divider elements 20 and thus four rotors 21, then to achieve uniform angular stepping or a uniform angular displacement between the individual rotors 21, there can be a finer angular stepping with angular regions of about 15o within the segment 25 defined by the blade elements 13 in the respective rotors 21.

The above-described embodiment having four divider elements 20 and thus four rotors 21 is used for example in the arrangement of the divider elements 20a-20d shown in FIG. 3B.

The foregoing description of the apertures 17 displaced by predetermined angles in the various rotors 21 wherein the respective apertures 17 in the rotors 21 are displaced relative to each other by the same respective angle. The invention however is not limited thereto as the advantages afforded by the present invention are achieved in the same fashion if, within a plurality of divider elements 20 and thus an identical plurality of rotors 21, similar or different or in part similar and different angular displacements or angular spacings are formed between the rotors 21. In any event, different displacement angles are possible by a corresponding differing arrangement of the respective openings 17 in the respective rotors 21.

A similar arrangement can also be achieved if there are two divider elements 20 and thus two rotors 21, which are connected together. In this case, a preferred angular displacement between the rotors 21 is about 30o when there are three blade elements 13.

The foregoing description describes the rotors 21 of the divider elements 20 as rotatable about the axis of rotation 23 while the axis of rotation 23 is not embodied as a shaft. Rather, the rotors 21 of the individual divider elements 20 are connected by the connecting devices the shaft members 18 and the apertures 17 in the rotors 21). The shaft members 18 and the associated apertures 17 are not in the same location as the axis of rotation 23 but are spaced relative to the axis of rotation 23 by a predetermined amount which is dependent on the size of the rotor R 21.

In this case, the shaft members 18 can extend rectilinearly and thus parallel to the axis of rotation 23 through all rotors 21. The invention is not limited thereto however and at least one rotor 21 of a plurality of rotors 21 can be of such a configuration that the apertures 17 do not extend in the axial direction through the entire rotor 21 over its axial extent, but are only of a predetermined depth within a rotor 21 so that on one side of the rotor 21, apertures 17 are arranged at a predetermined position within the respective segments 25 of the rotor 21, while on the other side of the rotor 21 the corresponding apertures 17 are arranged at a different angular position within the segment 25 so that further steps in an angular displacement between the rotors 21 of a plurality of divider elements 20 and thus rotors 21 is achieved. The apertures 17 are then not continuous in axial length in that rotor 21.

The mounting of the rotors 21 can be effected on the one hand by sliding contact within the main chamber 12 of the stator 11, and/or on the other hand by way of the shaft members 18 and apertures 17. As shown in FIG. 1, there are provided mounting regions 26a and 26b in which mounting elements (not shown in detail in the Figures) are arranged and are operatively connected to the shaft members 18 extending through the individual rotors 21.

In accordance with the foregoing description, the rotors 21 connected by means of the shaft members 18 are passively supported and are moved by means of the filling substance F which flows into the main chamber 12 of each divider element 20 under a predetermined pressure. The invention however is not limited thereto and there is also the possibility of providing a controlled drive 27, for example with an electric motor or the like, which is arranged in a drive block 19 (see FIG. 1).

Depending on the viscosity or viscousness of the filling substance F, it may be necessary for the rotors 21 of the divider elements 20 may need to be driven in specifically targeted and regulated fashion. The drive 27 can be linked to detecting the rotary speed or also the angle of rotation of the rotors 21 of the divider elements 20, which corresponds to the metering amount and/or flow speed of the mass flow of the filling substance F.

With the arrangement of the inlet passages 15 and the outlet passages 16 as corresponding feed flow and discharge flow openings for the intake flow and outlet flow of the filling substance F, the two passages 15 and 16 are smaller in the direction of the axis of rotation 23 than the extent of the stator 11. This arrangement ensures that the respective end regions 13a of the blade elements 13 always bear slidingly against at least a part of the inner wall 22 of the stator 11 when the rotor 21 rotates so that sliding radial displacement of the individual blade elements 13 within the rotor 21 is limited to be within the main chamber 12 of the stator 11. The blade elements 13 are thus of a length in the radial direction relative to the axis of rotation 23 so that when the rotor 21 rotates they are guided by the sliding contact against the inner wall 22 of the stator 11. Further components such as springs for guiding the blade elements 13 are not required.

Thus, the occurrence of pressure fluctuations and in particular pressure peaks can be avoided or at least considerably reduced by structural measures. This configuration ensures a uniform flow for the filling substance within the filling flow divider 1 and also in the direction of the packs to be filled. The uniform flow also reduces the risk of the filling substance F being changed and ruined in terms of its consistency or separated into its mixture components. Fluctuations in portioning accuracy are also considerably reduced by avoiding or at least reducing the pressure fluctuations.

The reduction in pressure peaks is substantially related to the rotors 21 which are respectively displaced relative to each other by a predetermined angle within the respective divider element 20, and is also enhanced by the respective divider elements 20 and in particular the respective stators 11 of the divider elements 20 being arranged directly in a row with each other. To this end, the main chambers 12 of each divider element 20 collectively form a continuous opening which extends in the axial direction and which comprises all main chambers 12 of the interconnected divider elements 20. The possibility that the main chambers 12 of the divider elements 1 can communicate with each other and the possibility of communication between the subchambers 14 of the respective rotors R 21 makes it possible to reduce pressure differences both in respect of a lower and also in respect of a higher pressure in a simple fashion by virtue of that structural arrangement. Pressure equalization between the divider elements 20 is guaranteed without further sensors or other elements in a structural and regulating aspect. In particular, pressure peaks are damped in relation to subchambers 14 which are already involved in the filling process, with the portioning result being considerably improved.

The present invention has been described hereinbefore by means of embodiments by way of example with reference to the accompanying Figures.

It is however self-evident to the man skilled and active in this art that the configuration of the present invention in accordance with the above-described Figures and the references used for the respective components and constituent parts as well as the details by way of example are not to be interpreted in a limiting sense. The size relationships and proportions specified in the individual Figures are also shown only diagrammatically and in simplified form for better understanding thereof. The invention is not restricted to the specified views. Rather all embodiments and variants which are embraced by the accompanying claims are deemed to belong to the invention.

The invention claimed is:

1. A filling flow divider for portioning a filling substance, the filling flow divider comprising:
at least two divider elements operatively connected to each other, each of the divider elements including a stator with a main chamber, a rotor positioned within the main chamber and rotatable about an axis of rotation, and at least two blade elements coupled to the rotor and displaceable in a radial direction relative to the axis of rotation with respect to the rotor, the rotor being configured to rotate the at least two blade elements in the main chamber with respect to the stator, and the at least two blade elements of each divider element dividing the main chamber into subchambers having dynamically variable size as the at least two blade elements rotate with respect to the stator; and
at least two connecting devices coupling the rotors of the at least two divider elements together,
wherein the rotor and blade elements of one of the divider elements define a first rotary angle position about the axis of rotation, and the rotor and blade elements of another of the divider elements define a second rotary angle position about the axis of rotation different than the first rotary angle position, and the subchambers of adjacent divider elements are in communication with each other to equalize pressure in the subchambers.

2. The filling flow divider of claim 1, wherein the rotor of each divider element further includes apertures arranged parallel to the axis of rotation, the apertures configured to receive the at least two connecting devices.

3. The filling flow divider of claim 2, wherein the at least two connecting devices include bar-shaped connecting elements inserted through the apertures in the rotors.

4. The filling flow divider of claim 1, wherein each rotor includes a plurality of slot-shaped radial apertures configured to receive the at least two blade elements of the respective divider element.

5. The filling flow divider of claim 4, wherein the main chamber of each stator includes an inner wall, and the at least two blade elements of each divider element move radially within the slot-shaped radial apertures such that the at least two blade elements slide along the inner wall as the rotor rotates about the axis of rotation.

6. The filling flow divider of claim 1, wherein the at least two connecting devices extend in an axial direction parallel to the axis of rotation.

7. The filling flow divider of claim 6, wherein the at least two connecting devices extend axially through each of the rotors to a drive motor.

8. The filling flow divider of claim 1, wherein the at least two blade elements of each rotor are located at equal angular spacings around a periphery of the rotor.

9. The filling flow divider of claim 1, wherein the stators of adjacent divider elements are coupled together such that the main chambers of the adjacent divider elements are aligned with each other.

10. The filling flow divider of claim 1, wherein each stator includes an inlet passage and an outlet passage in communication with the main chamber, and rotation of the rotor is driven by flow of the filling substance into the main chamber from the inlet passage.

11. A filling flow divider for portioning a filling substance, the filling flow divider comprising:

at least two divider elements operatively connected to each other, each of the divider elements including a stator with a main chamber, a rotor positioned within the main chamber and rotatable about an axis of rotation, and at least two blade elements coupled to the rotor and displaceable in a radial direction relative to the axis of rotation with respect to the rotor, the rotor being configured to rotate the at least two blade elements in the main chamber with respect to the stator; and at least two connecting devices coupling the rotors of the at least two divider elements together, wherein the rotor and blade elements of one of the divider elements define a first rotary angle position about the axis of rotation, and the rotor and blade elements of another of the divider elements define a second rotary angle position about the axis of rotation different than the first rotary angle position, wherein the rotor of each divider element further includes apertures arranged parallel to the axis of rotation, the apertures configured to receive the at least two connecting devices, wherein the at least two connecting devices include bar-shaped connecting elements inserted through the apertures in the rotors, wherein the apertures in one rotor are located at a first position relative to the at least two blade elements coupled to the one rotor, and the apertures in another adjacent rotor are located at a second position relative to the at least two blade elements coupled to the adjacent rotor.

12. The filling flow divider of claim 11, wherein inserting the bar-shaped connecting elements through the apertures in adjacent rotors automatically aligns the adjacent rotors at the different first and second rotary angle positions because of the differing positions of the apertures relative to the at least two blade elements.

13. The filling flow divider of claim 11, wherein each of the at least two divider elements include three blade elements arranged at equal angular spacings relative to each other such that each rotor includes a segment having an arc length of 60 degrees between each blade element.

14. The filling flow divider of claim 13, wherein the apertures in adjacent rotors extend through different sub-segments of the segments having an arc length of 60 degrees.

* * * * *